(12) United States Patent
Patil et al.

(10) Patent No.: US 9,949,156 B2
(45) Date of Patent: Apr. 17, 2018

(54) EFFICIENT RANGING

(71) Applicant: QUALCOMM Incorporated, San Diego, CA (US)

(72) Inventors: Abhishek Pramod Patil, San Diego, CA (US); Santosh Paul Abraham, San Diego, CA (US); George Cherian, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 15/042,041

(22) Filed: Feb. 11, 2016

(65) Prior Publication Data

US 2016/0242056 A1 Aug. 18, 2016

Related U.S. Application Data

(60) Provisional application No. 62/116,219, filed on Feb. 13, 2015.

(51) Int. Cl.
*H04W 24/10* (2009.01)
*H04W 24/08* (2009.01)
(Continued)

(52) U.S. Cl.
CPC .......... *H04W 24/08* (2013.01); *H04W 4/008* (2013.01); *H04W 56/001* (2013.01); *H04W 64/00* (2013.01); *H04W 76/023* (2013.01)

(58) Field of Classification Search
CPC ..... H04W 24/08; H04W 4/008; H04W 64/00; H04W 76/023; H04W 56/001
See application file for complete search history.

(56) References Cited

U.S. PATENT DOCUMENTS 7,813,326 B1\* 10/2010 Kelm .................. H04L 45/08
  370/238
9,148,752 B2\* 9/2015 Hart .................. H04W 4/02
(Continued)

OTHER PUBLICATIONS

Aldana C., "Proposed Resolution for Revmc—CID 2164, 11-14-0168-07-000m-Proposed-Resolution-for-Revmc-cid-2164", IEEE Draft, 11-14-0168-87-088m-Proposed-Resolution-For-Revmc-Cid-2164, IEEE-Sa Mentor, Piscataway, NJ USA, vol. 802.11m, No. 7, Mar. 20, 2014 (Mar. 20, 2014), pp. 1-20, XP068868854, [retrieved on Mar. 20, 2014] the whole document.
(Continued)

*Primary Examiner* — Brian D Nguyen
(74) *Attorney, Agent, or Firm* — Patterson & Sheridan, LLP

(57) ABSTRACT

Aspects of the present disclosure provide techniques for efficient ranging, for example, in a neighbor aware network (NAN). According to certain aspects, an apparatus for wireless communications is provided. The apparatus generally includes a processing system configured to determine a period that at least one second apparatus is scheduled to be awake, generate a first frame for transmission to the second apparatus during the period, determine ranging information based on a time difference between transmission of the first frame and receipt of a second frame in response to the first frame, and generate a third frame including the ranging information; a transmit interface configured to output the first and third frames for transmission; and a receive interface configured to obtain the second frame. By exchanging ranging information in already scheduled wake-up periods and in existing frame, power consumption and signaling overhead may be reduced.

30 Claims, 11 Drawing Sheets

(51) Int. Cl.
*H04W 4/00* (2018.01)
*H04W 64/00* (2009.01)
*H04W 76/02* (2009.01)
*H04W 56/00* (2009.01)

(56) References Cited

U.S. PATENT DOCUMENTS

| | | | | |
|---|---|---|---|---|
| 9,226,260 | B2* | 12/2015 | Steiner | H04W 64/00 |
| 9,237,546 | B1* | 1/2016 | Zhang | H04W 64/00 |
| 9,439,147 | B2* | 9/2016 | Huang | H04W 52/0229 |
| 9,585,080 | B2* | 2/2017 | Hareuveni | H04W 64/00 |
| 2014/0198724 | A1 | 7/2014 | Abraham et al. | |
| 2015/0365835 | A1 | 12/2015 | Segev et al. | |

OTHER PUBLICATIONS

International Search Report and Written Opinion—PCT/US2016/017708—ISA/EPO—May 6, 2016.
Stanton K B., "The Use of 802.11 Timing Measurement by p802.1ASbt / p802.1AS-Rev PLUS What is asCapable for 802.11 Ports Rev2 Kevin B. Stanton Intel Corporation Jul. 14, 2014, Asbt-Kbstanton-use-of-Timing-Measurement-0714-v02", IEEE Draft, Asbt-Kbstanton-Use-Of-Timing-Measurement-0714-V02, IEEE-SA, Piscataway, NJ USA, vol. 802, No. v02, Jul. 17, 2014 (Jul. 17, 2014), pp. 1-7, XP068096289, [retrieved on Jul. 17, 2014] the whole document.

* cited by examiner

EFFICIENT RANGING

CLAIM OF PRIORITY UNDER 35 U.S.C. § 119

The present application for patent claims benefit of U.S. Provisional Patent Application Ser. No. 62/116,219, filed Feb. 13, 2015, assigned to the assignee hereof and hereby expressly incorporated by reference herein.

BACKGROUND

Field of the Disclosure

Certain aspects of the present disclosure generally relate to wireless communications and, more particularly, efficient ranging, for example, in a neighbor aware network (NAN).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to wireless communications and, more particularly, efficient ranging, for example, in a neighbor aware network (NAN).

Aspects of the present disclosure provide an apparatus for wireless communications. The apparatus generally includes a processing system configured to a processing system configured to determine a period that at least one wireless device is scheduled to be awake, generate a first frame for transmission to the wireless device during the period, determine ranging information based on a time difference between transmission of the first frame and receipt of a second frame in response to the first frame, and generate a third frame including the ranging information, a first interface configured to output the first and third frames for transmission, and a second interface configured to obtain the second frame.

Aspects of the present disclosure provide an apparatus for wireless communications. The apparatus generally includes a processing system configured to determine a period to awake from a first power state, generate a second frame for transmission to a wireless device in response to a first frame received from the wireless device during the period, and determine a relative location of the wireless device to the apparatus based on a third frame comprising ranging information, a first interface configured to output the second frame for transmission to the wireless device, and a second interface configured to obtain the first frame and the third frame.

Aspects of the present disclosure provide a method for wireless communications by a first apparatus. The method generally includes determining, by an apparatus, a period that at least one wireless device is scheduled to be awake, generating a first frame for transmission to the wireless device during the period, determining ranging information based on a time difference between transmission of the first frame and receipt of a second frame in response to the first frame, and generating a third frame including the ranging information; outputting the first and third frames for transmission; and obtaining the second frame.

Aspects of the present disclosure provide a method for wireless communications by a first apparatus. The method generally includes determining, by an apparatus, a period to awake from a first power state, generating a second frame for transmission to a wireless device in response to a first frame received from the wireless device during the period, determining a relative location of the wireless device to the apparatus based on a third frame comprising ranging information, outputting the second frame for transmission to the wireless device, and obtaining the first frame and the third frame.

Aspects of the present disclosure provide an apparatus for wireless communications. The apparatus generally includes means for determining a period that at least one wireless device is scheduled to be awake, means for generating a first frame for transmission to the wireless device during the period, means for determining ranging information based on a time difference between transmission of the first frame and receipt of a second frame in response to the first frame; and means for generating a third frame including the ranging information, means for outputting the first and third frames for transmission, and means for obtaining the second frame.

Aspects of the present disclosure provide an apparatus for wireless communications. The apparatus generally includes means for determining a period to awake from a first power state, means for generating a second frame for transmission to a wireless device in response to a first frame received from the wireless device during the period, means for determining a relative location of the wireless device to the apparatus based on a third frame comprising ranging information, means for outputting the second frame for transmission to the wireless device, and means for obtaining the first frame and the third frame.

Aspects of the present disclosure provide a computer-readable medium having instructions stored thereon for determining, by an apparatus, a period that at least one wireless device is scheduled to be awake, generating a first frame for transmission to the wireless device during the period, determining ranging information based on a time difference between transmission of the first frame and receipt of a second frame in response to the first frame, and generating a third frame including the ranging information, outputting the first and third frames for transmission, and obtaining the second frame.

Aspects of the present disclosure provide a computer-readable medium having instructions stored thereon for determining, by an apparatus, a period to awake from a first power state, generating a second frame for transmission to a wireless device in response to a first frame received from the wireless device during the period, determining a relative location of the wireless device to the apparatus based on a third frame comprising ranging information, outputting the second frame for transmission to the wireless device, and obtaining the first frame and the third frame.

Aspects of the present disclosure provide a station. The station generally includes at least one antenna, a processing system configured to determine a period that at least one wireless device is scheduled to be awake, generate a first frame for transmission to the wireless device during the period, determine ranging information based on a time difference between transmission of the first frame and receipt of a second frame in response to the first frame, and generate a third frame including the ranging information, a transmitter configured to transmit, via the at least one antenna, the first and third frames for transmission, and a receiver configured to receive, via the at least one antenna, the second frame.

Aspects of the present disclosure provide a station. The station generally includes a processing system configured to determine a period to awake from a first power state, generate a second frame for transmission to a wireless device in response to a first frame received from the wireless device during the period, and determine a relative location of the wireless device to the apparatus based on a third frame comprising ranging information, a transmitter configured to transmit, via the at least one antenna, the second frame for transmission to the wireless device, and a receiver configured to receive, via the at least one antenna, the first frame and the third frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
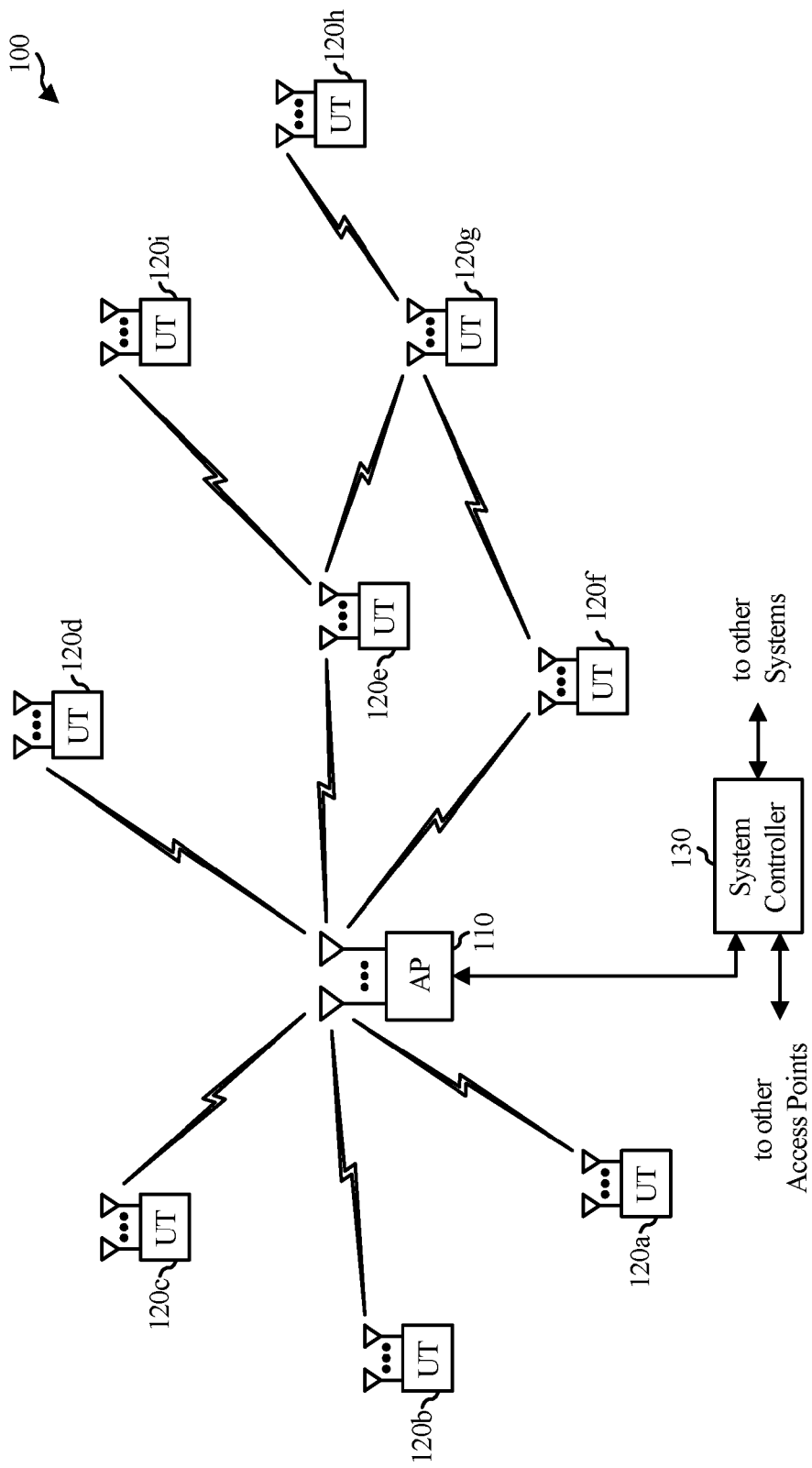
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to wireless communications and, more particularly, efficient ranging, for example, in a neighbor aware network (NAN). As used herein, the term ranging generally refers to any suitable technique for obtaining relatively accurate information (e.g., within 1 m or less) regarding position of a device (or devices). In some cases, ranging using existing wireless network infrastructure may yield accurate positioning. Such information may be used in a variety of applications, such as emergency rescue, service delivery, or network optimization.

As will be described in more detail herein, fine timing measurement (FTM) information (e.g., or other type ranging information) may be exchanged during times when the stations are already scheduled to be awake (e.g., during a paging window or a data window). Further, the FTM information may be exchanged in existing frames (e.g., association frames, trigger/polling frames, probe response/probe request frames). FTM information may also be received via a proxy station which may be a stationary device that has ranged with other stations. The FTM information, coupled with a known location of the stationary device may allow for "ranging by proxy." In some cases, a proxy device may provide ranging information for another device to a requesting station (e.g., that is out of range of the other device).

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA") such as an "AP STA" acting as an AP or a non-access point STA or "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communications System

FIG. 1 illustrates a system 100 in which aspects of the disclosure may be performed. For example, any of the wireless stations including the access point 110 and/or the user terminals 120 may be in a neighbor aware network (NAN). Wireless stations may exchange fine timing measurement (FTM) information for ranging during a period when the wireless stations are already scheduled to wake up (e.g., during a paging window or data window) and may exchange the FTM information using existing frames (e.g., association frames, trigger/polling frames, probe request/probe response frames). In aspects, one of the wireless devices may act as a ranging proxy.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
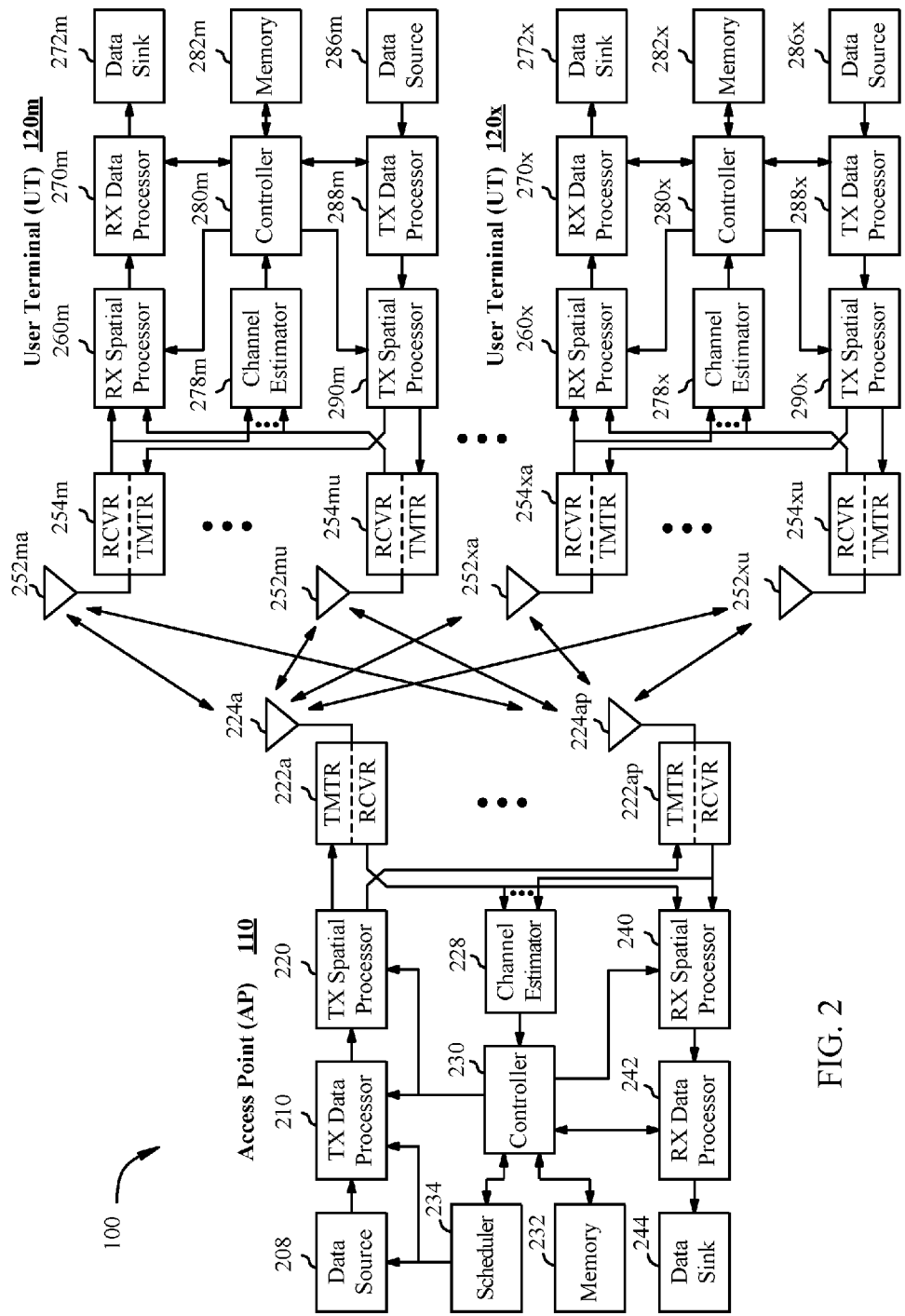
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, and/or processors 210, 220, 240, 242, of the AP 110, and/or controller 230 or antenna 252, Tx/Rx 254, processors 260, 270, 288, and 290, and/or controller 280 of UT 120 may be used to perform the operations 700 and 700A described herein and illustrated with reference to FIGS. 7 and 7A, respectively, and operations 900 and 900A described herein and illustrated with reference to FIGS. 9 and 9A, respectively.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{np}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted (communicated) by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
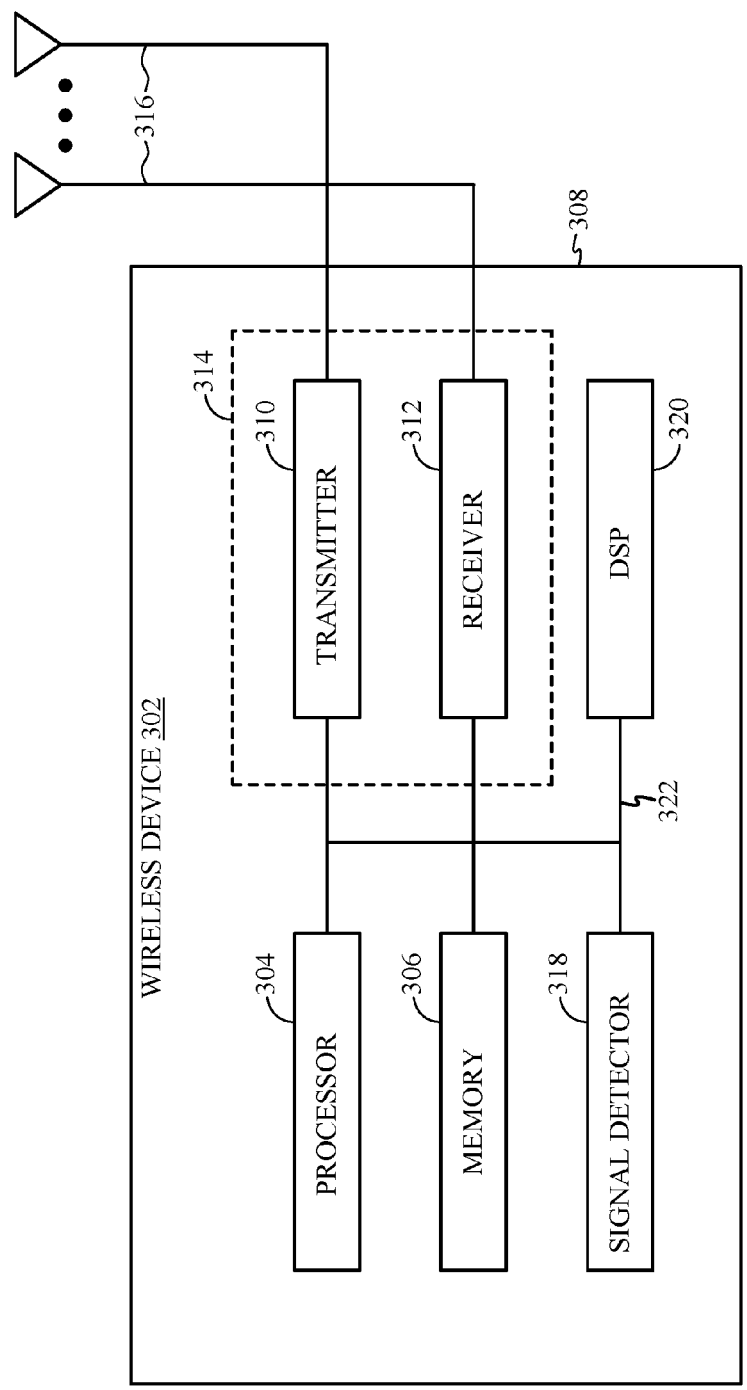
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 700 and 900 illustrated in FIGS. 7 and 9, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Neighbor Aware Network

Due to the increasing popularity of location-enabled (e.g., GPS-enabled) mobile devices, neighbor aware networks (NANs) are emerging. A NAN may refer to a network for communication between stations (STAs) that are located in close proximity to each other. NAN provides a mechanism for devices to synchronize the time and channel on which they converge to facilitate the discovery of service that have been made discoverable on existing devices or new devices that enter the environment.

A NAN discovery window may refer to the time and channel on which NAN devices converge. A collection of NAN devices (a WiFi capable device that supports NAN protocols and which may be NAN Master or NAN non-Master) that are synchronized to the same discovery window schedule may be referred to as a NAN cluster.

Figure 4:
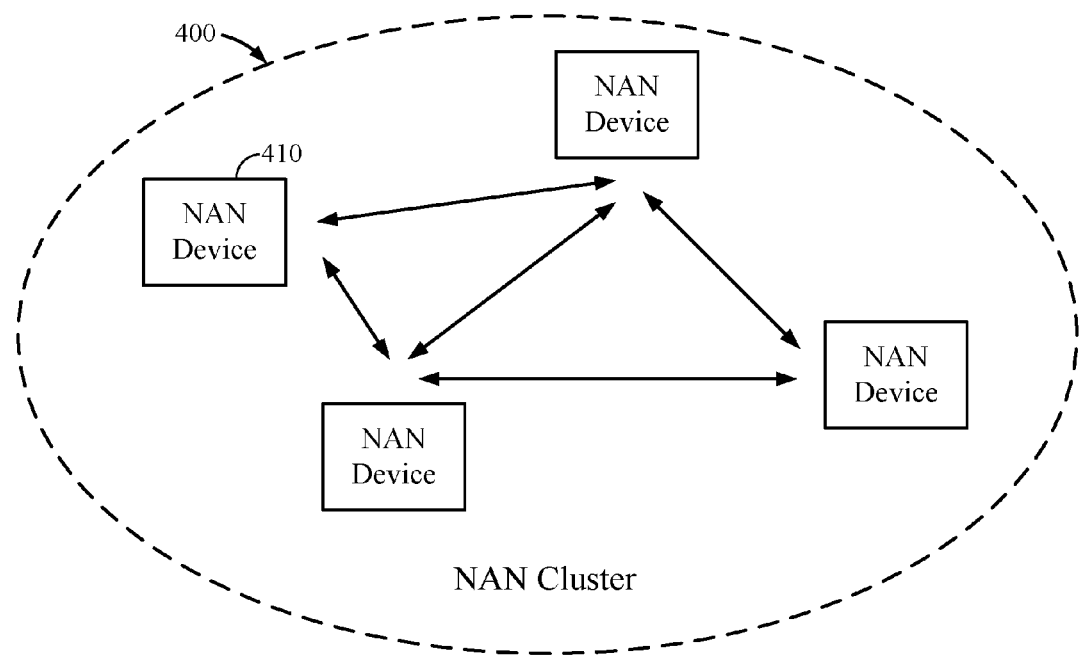
FIG. 4 illustrates an example neighbor aware network (NAN) cluster in accordance with certain aspects of the present disclosure.

FIG. 4 illustrates an example NAN cluster 400, in accordance with certain aspects of the present disclosure. NAN Devices 410 (e.g., such as AP 110 or user terminal 120) that are part of the same NAN Cluster 400 may participate in the NAN Master Selection procedure. Depending on changes in the NAN Cluster 400, such as changes to which NAN Devices 410 are part of the NAN Cluster 400 and/or changes to their Master Ranks, different NAN Devices 410 may be elected to become NAN Devices in Master role at different times.

In some cases, a NAN ID may be used to signify a set of NAN parameters (e.g., applicable to a device that is a member, or devices that are members, of a NAN cluster or network of NAN clusters), A NAN network may, thus, refer to a collection of NAN clusters that share the same NAN ID.

Figure 5:
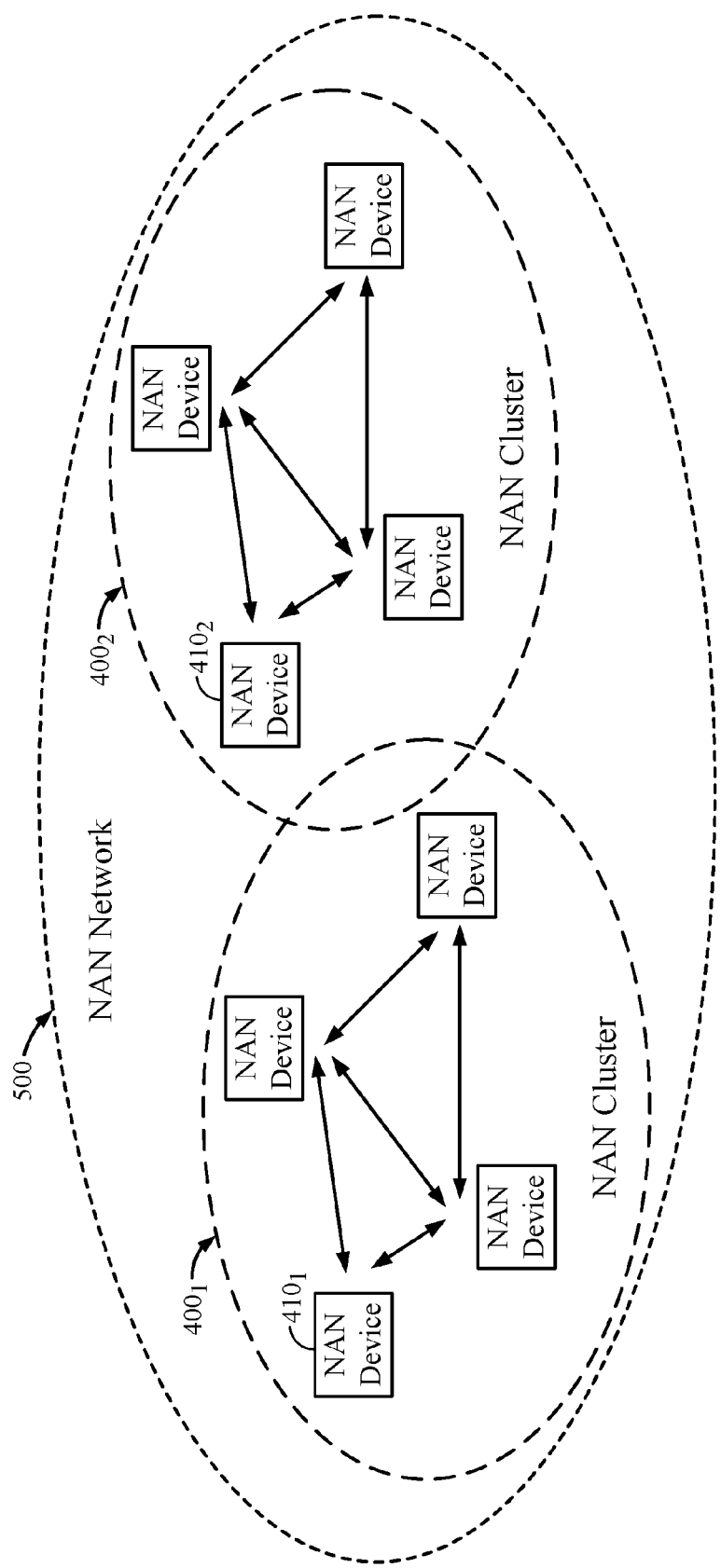
FIG. 5 illustrates an example NAN network with overlapping NAN clusters, in accordance with certain aspects of the present disclosure.

FIG. 5 illustrates an example NAN network 500 with overlapping NAN clusters $400_1$ (of NAN devices $410_1$) and $400_2$ (of NAN devices $410_2$), in accordance with certain aspects of the present disclosure. Although not shown in FIG. 5, a NAN device may participate in more than one overlapping cluster. Also not shown, a NAN device may operate concurrently in a NAN network with other types of WiFi networks (e.g., STAs in different homes or buildings as part of independent LANs with different external network connections) such as a wireless local area network (WLAN) or WiFi Direct.

NANs generally utilize a discovery window to advertise the existence of devices, services offered by the NAN, and synchronization information. During the discovery window, the NAN Devices are available (make themselves available) with high probability for mutual discovery. During interim periods the devices may be asleep or involved with other activities, for example, communicating on other networks, possibly on a different channel. A NAN device that creates the NAN cluster may define a series of discovery window start times (DWSTs).

NAN Devices participating in the same NAN Cluster are synchronized to a common clock. During a discovery window, one or more NAN Devices transmit NAN Synchronization Beacon frames to help all NAN Devices within the NAN Cluster synchronize their clocks. A timing synchronization function (TSF) keeps the timers of all NAN Devices in the same NAN Cluster synchronized. The TSF in a NAN Cluster may be implemented via a distributed algorithm and NAN Beacon frames can be transmitted according to the algorithm. A relative starting point or "time zero" may be defined as the first DWST. According to certain aspects, all devices in the NAN may wake up at the first discovery window (DW0), which may be defined, for example, as the discovery window in which the lower 23 bits of the TSF are zero. During subsequent discovery windows, certain NAN devices may choose to be awake (e.g., wake up if in a power save mode) or not be awake (e.g., enter or remain in a power save). Such synchronization may, thus, decrease the discovery latency, power consumption, and medium occupancy that would otherwise occur.

The NAN synchronization procedure is typically separate from the service discovery messaging. Although a NAN Device transmits not more than one Synchronization Beacon in a discovery window, multiple NAN Service Discovery frames may be transmitted by a NAN Device in a discover window. NAN Service Discovery frames enable NAN Devices to look for services from other NAN Devices and make services discoverable for other NAN Devices.

Example Efficient Ranging

As will be described in more detail herein, fine timing measurement (FTM) information may be exchanged during times when the stations are already scheduled to be awake (e.g., during a paging window or a data window). Further, the FTM information may be exchanged in existing frames rather than dedicated frames. As an example, FTM information may be exchanged in association frames, trigger/polling frames, probe response frames, and/or probe request frames.

FTM information may also be received via a proxy station which may be a stationary device that has ranged with other stations. By knowing a location of the stationary device serving as a proxy, information regarding relative (or absolute) position the other stations may be determined.

Neighbor aware networks (NANs) may enable services between devices where the distance between devices is a criteria for the operation of the service. In one illustrative example, a doctor in a hospital may wish to use a mobile device such as, for example, a phone or tablet to find the location of a high demand medical device such as, for example, a mobile x-ray machine. If the doctor's mobile device and the mobile x-ray machine are in a NAN data link (NDL) network, the doctor's mobile device may perform ranging to determine the location of nearby devices, which may include the x-ray machine, as well as to determine the services offered by the nearby devices (e.g., x-ray).

In this manner, ranging results may trigger services or actions. For example, if the ranging indicates the services are nearby, an action may be taken, such as providing a notification to the doctor (e.g., an alarm on the doctor's mobile device). As another example, ranging may be used to monitor patient locations (e.g., by ranging with a "wearable" device on the patient. If the ranging indicates the patient has wandered too far (e.g., from their bed or room), an alarm may be sounded. In this manner, ranging may be used as a sort of "invisible fence" with a perimeter established at a desired distance. This may be useful to monitor children, pets, or even devices that tend to get stolen (e.g., shopping carts, merchandise, and the like).

Fine timing measurement (FTM) generally refers to a ranging protocol (e.g., as defined in IEEE 802.11mc wireless standard) that measures the distance between two stations (STAs) by measuring round trip delay of messages transmitted between an initiating STA and a responding STA. FTM may have a ranging accuracy of around 3 meters. In some cases, a single burst FTM measurement can be accomplished by exchanging multiple frames (e.g., a burst of 6 frames) between the initiating STA and the responding STA.

Figure 6:
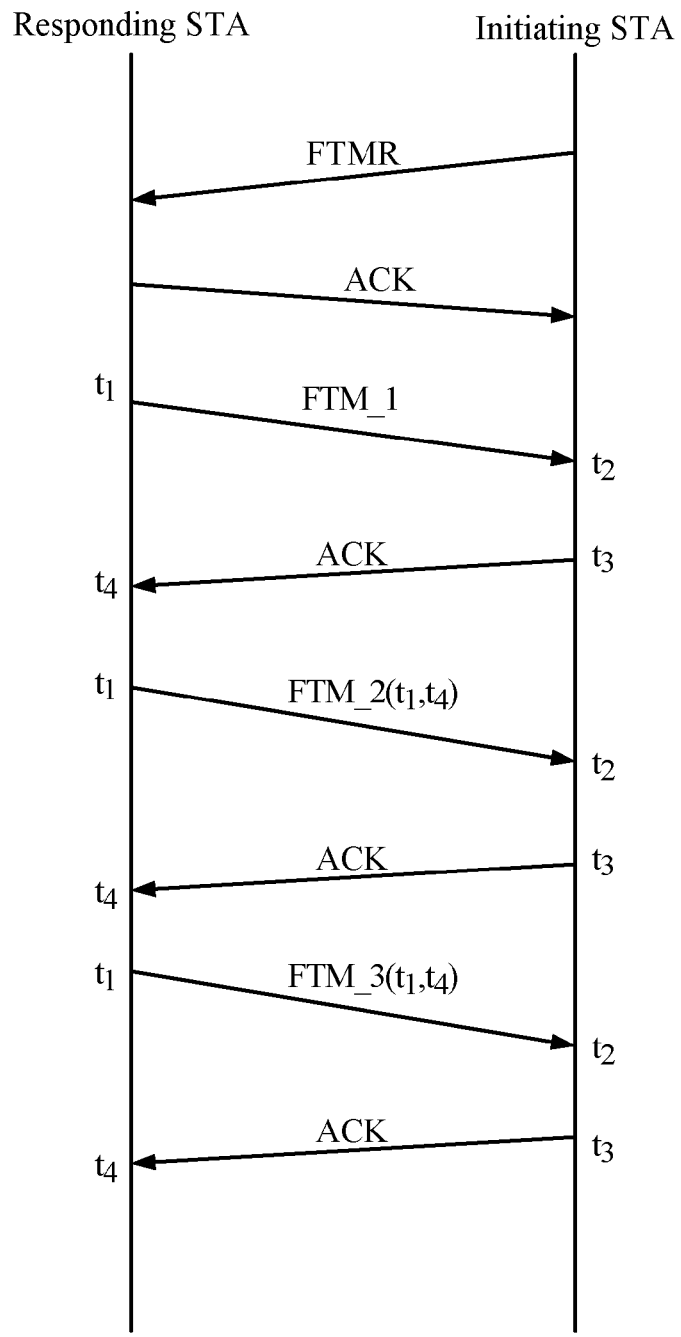
FIG. 6 is an example call flow illustrating a frame exchange for a fine timing measurement (FTM) procedure, in accordance with certain aspects of the present disclosure.

FIG. 6 is an example call flow 600 illustrating a frame exchange for an example FTM procedure. As shown in FIG. 6, the Initiating STA may send an FTM Request (FTMR) frame to the Responding STA to start the FTM procedure. The Responding STA may send an ACK to the Initiating STA. After the FTMR and ACK, the Responding STA may start sending FTM frames (with the transmission times for the FTM frames indicated as $t_1$) which may be received by the Initiating STA at a time indicated as $t_2$. At $t_3$ the Initiating STA may respond with an ACK which may be received by the Responding STA at $t_4$.

As illustrated, these steps may be repeated for each FTM frame (FTM_1, FTM_2, FTM_3) transmitted by the Responding STA, for a total burst exchange of 6 FTM frames. In each case, the current FTM frame may have the $t_1$ and the $t_4$ values from the previous FTM frame embedded (e.g., FTM2 has the $t_1$ and the $t_4$ values from the FTM1 exchange). The Initiating STA may then use $t_1$, $t_2$, $t_3$, and $t_4$ (since it already knows t2 and t3, having received an FTM at t2 and having sent an ACK at t3) to estimate the RTT between the Responding STA and the Initiating STA.

The RTT may be used estimate the range (distance) between the two wireless stations. To determine its own 2D location, one wireless station may acquire RTT measurements from at least three other wireless stations that may have known 2D locations. The wireless station may use the RTT measurements from the other wireless stations to compute its own 2D location. This may increase the number of exchanged FTM frames and reduce network throughput.

Conventionally, FTM ranging is performed in an access point (AP)-station (STA) type of network where scheduling and resourcing is AP centric. Thus, little consideration is given to power save since the typically the AP is always ON. However, devices in NAN data link (NDL) network are synchronized via NAN beacons. Thus, device in the NDL network may wake up during a paging window. Since NAN typically involves STA-STA (peer-2-peer (P2P)) communications, it may be desirable to define FTM protocols that may conserve power.

Accordingly, techniques and apparatus for efficient ranging, for example, in a NAN are desirable. As will be described in greater detail below, such efficient ranging may take advantage of periods when devices are already scheduled to be on, for example, to listen for beacons.

Figure 7:
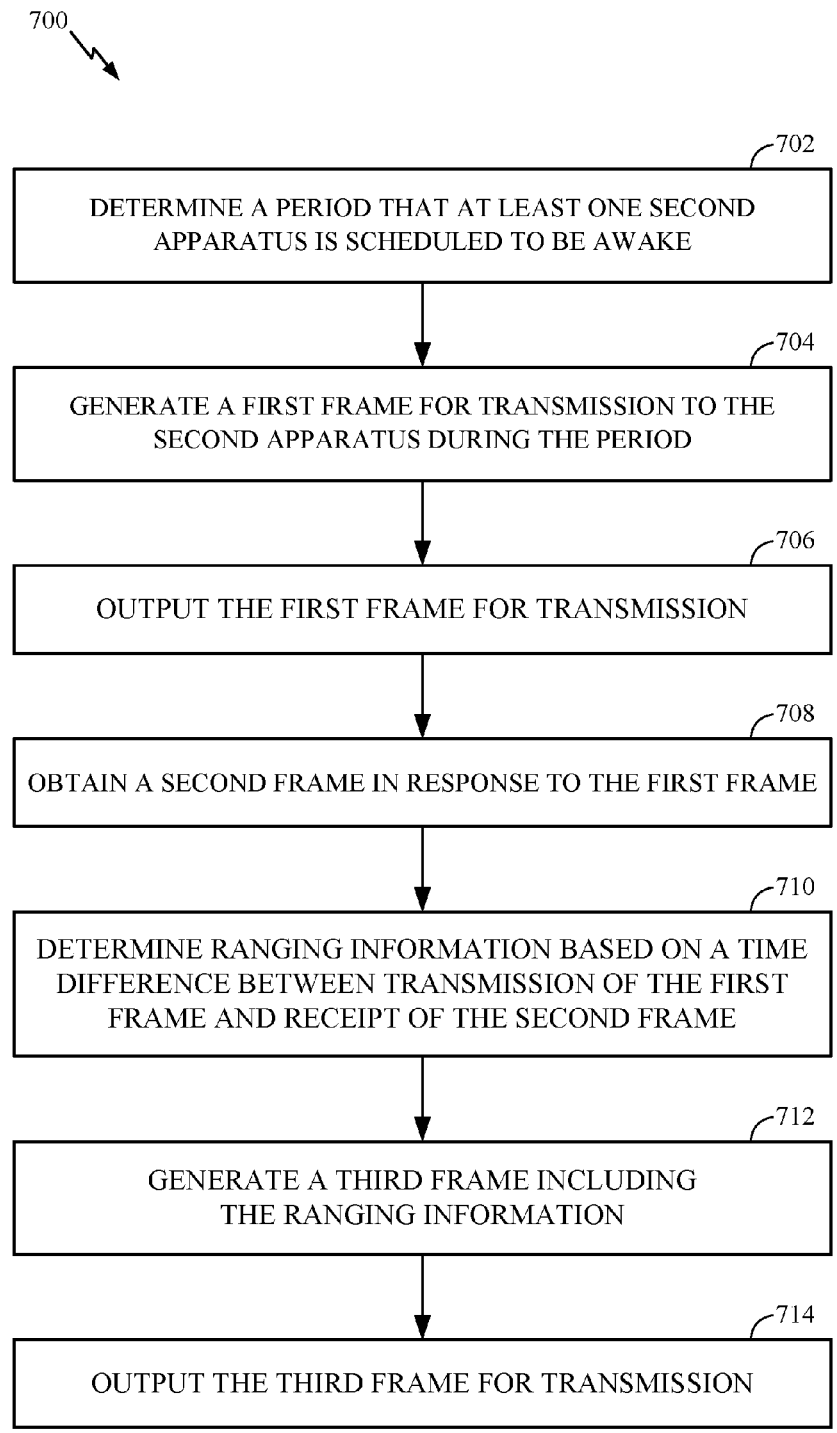
FIG. 7 illustrates a block diagram of example operations for wireless communications by an initiating apparatus, in accordance with certain aspects of the present disclosure.
Figure 7A:
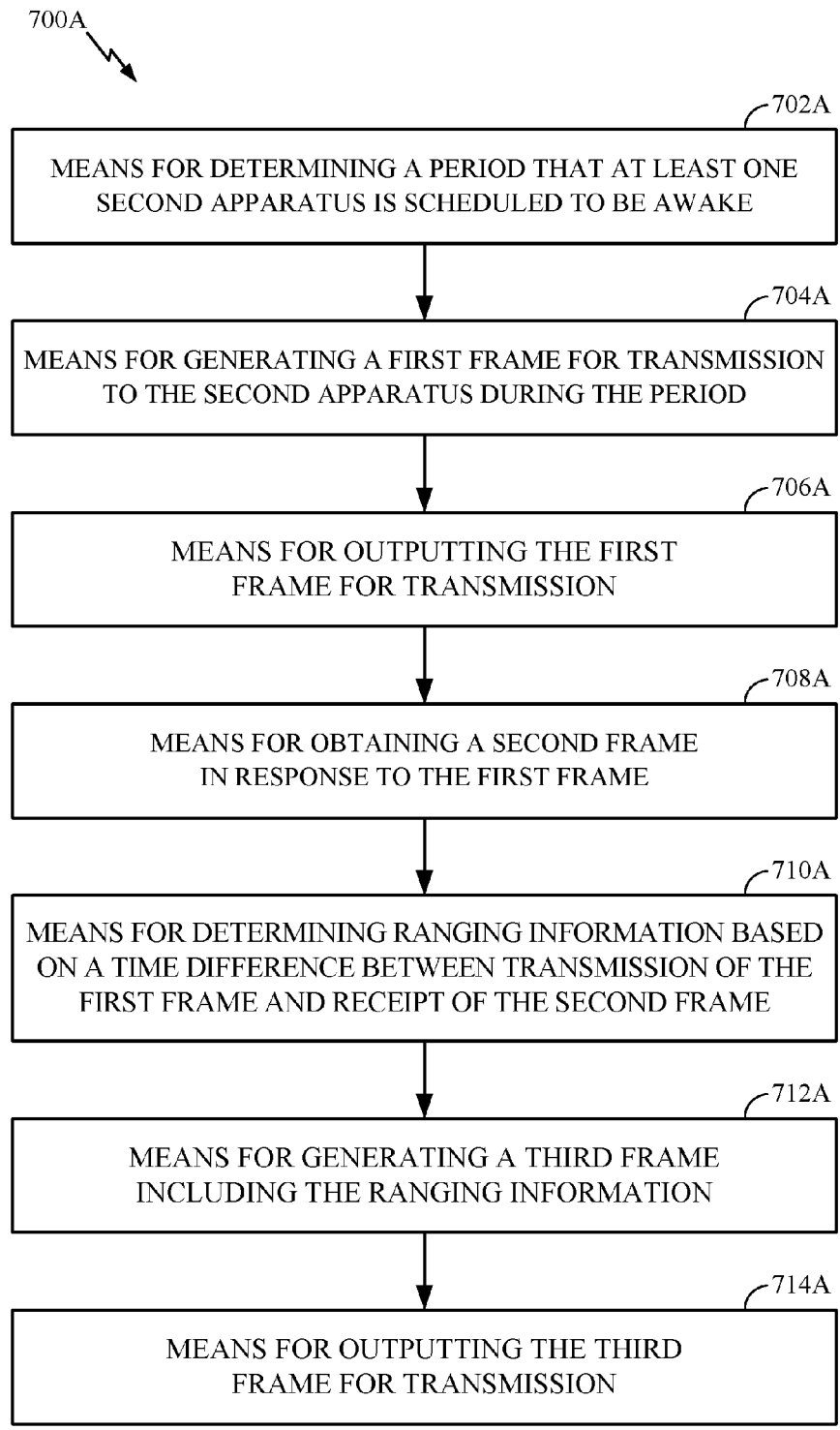
FIG. 7A illustrates example means capable of performing the operations shown in FIG. 7.

FIG. 7 illustrates a block diagram of example efficient ranging operations 700 for wireless communications by an apparatus, in accordance with certain aspects of the present disclosure. The operations 700 may be performed, for example, by an initiating STA (e.g., a user terminal 120 or AP 110).

The operations 700 begin, at 702, by determining a period that at least one second apparatus (e.g., the responder STA) is scheduled to be awake. The first and second apparatus may be non-AP STAs. The second apparatus may be in a NDL network. In one example, the initiating STA may determine that the second apparatus is scheduled to send or receive data during a data window and may exchange the frames during the data window (e.g., in trigger/polling frames).

At 704, the initiating STA may generate a first frame for transmission to the second apparatus during the period. At 706, the initiating STA may output the first frame for transmission.

At 708, the initiating STA may obtain a second frame in response to the first frame. At 710, the initiating STA may determine ranging (e.g., FTM) information based on a time difference between transmission of the first frame and receipt of the second frame (e.g., referring to FIG. 6, the $t_1$ and the $t_4$ values from the FTM exchange of the FTMR and response).

At 712, the initiating STA may generate a third frame including the ranging information. At 714, the initiating STA may output the third frame for transmission.

According to certain aspects, the initiating STA may determine to associate with the second apparatus and exchange the FTM information during an association procedure (e.g., in an association or authentication frame). In some cases, a STA may initiate an association procedure to associate with the second apparatus based on mobility information (information indicating mobility) received from the second apparatus. In some cases, mobility information may be used to determine how often to perform the ranging techniques described herein. For example, if a device is moving (or moving away), ranging may be performed with a greater frequency.

Alternatively, the initiating STA may exchange the frames in a probe response frame or probe request frames. According to certain aspects, the initiating STA may act as a ranging proxy by transmitting the third frame (e.g., in a broadcast discovery message, NAN service discovery message, or broadcast synchronization beacon) to a third apparatus. The initiating STA may also provide FTM information and service information to the third apparatus about other apparatuses it has ranged with. Fourth and fifth frames may also be exchanged in a similar manner with other devices.

Example Piggy-Backing FTM Data on Existing Frames During Awake Periods

Figure 8:
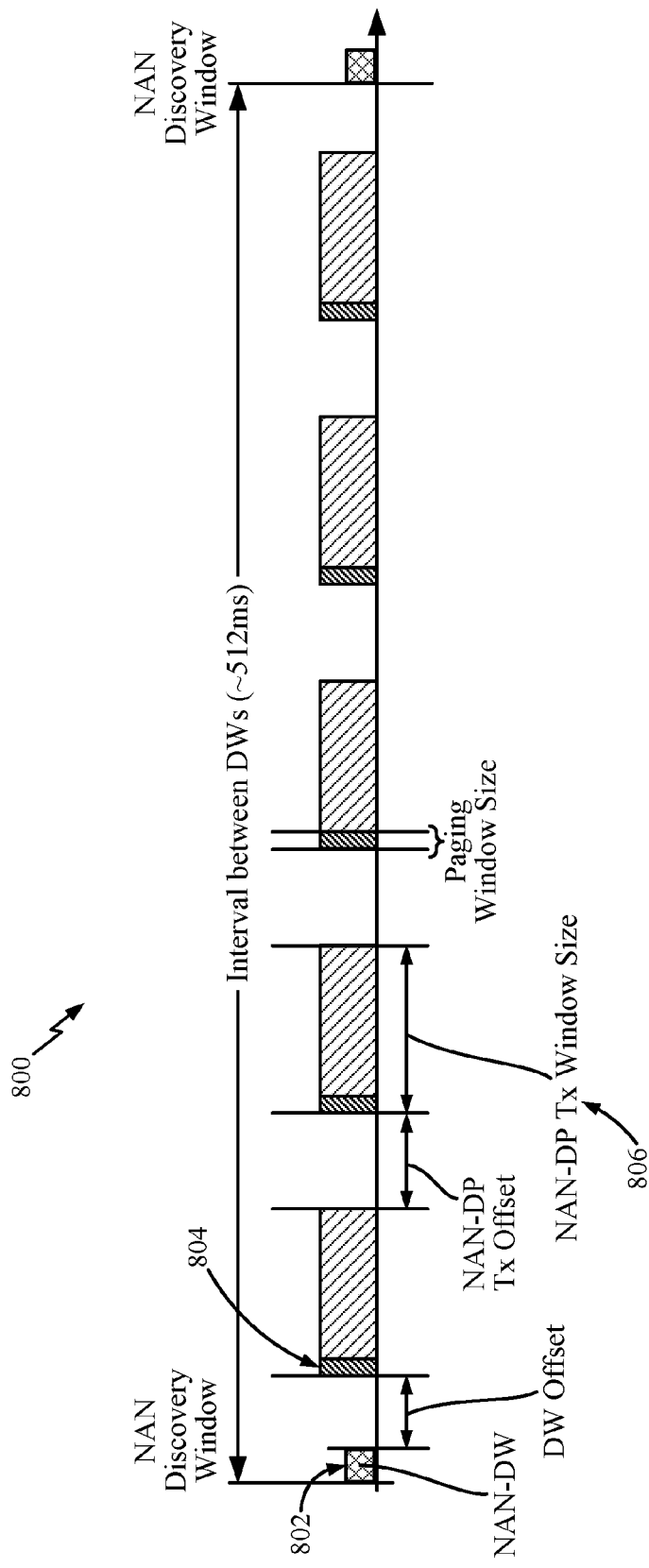
FIG. 8 is an example time sequence diagram illustrating an example discovery window period, in accordance with certain aspects of the present disclosure.

As illustrated by the example time sequence diagram 800 of FIG. 8, according to certain aspects, FTM frames may be exchanged between devices in an NDL network during periods where the devices will already be awake. In this manner, additional wake up times do not need to be scheduled for FTM (i.e., no additional time needs to be set aside for ranging), which may save power by allowing a device to stay in a low power state longer. As illustrated in FIG. 8, FTM frames may be exchanged during a scheduled discovery window period, in accordance with certain aspects of the present disclosure.

Since devices in an NDL network are synchronized via NAN beacons 802, wake-up and sleep times can be coordinated. For example, all participating devices in the NDL network wake up during the paging window 804 to send or monitor for traffic announcements from other devices in the NDL network. During the rest of the time data may be exchanged between the devices, and during the data window 806 the devices may sleep or wake-up depending on whether they have traffic to send or to receive. Since all device are awake during the paging window 804, routing and association message are also exchanged during this time.

According to certain aspects, FTM information may be transmitted during the data window 806 in trigger/polling frames. As mentioned above, devices in the NDL may send and/or receive traffic announcement (e.g., pages) during the paging window 804. Devices indicated in a transmitter's page may send a trigger frame at the beginning of the data window 806 to the transmitter to indicate their availability to receive traffic during the data window. The transmitter device may acknowledge the receiver device's trigger frame. A transmitter device may poll each receiver device at the beginning of the data window 806 to check if the receiver device is available to receive traffic during the data window 806. The receiver device may acknowledge the transmitter's poll.

According to certain aspects, the FTM information may be exchanged in the trigger frames and transmitter polls, and acknowledgments may serve as ACK to the FTM data in the frames. According to certain aspects, the rest of FTM information may be piggybacked as part of data exchanged between the two devices, allowing for efficient ranging without the need for separate frames.

According to certain aspects, FTM information may be transmitted in paging window during association in NDL secure association and authentication frames. A new device joins the NDL network by authenticating and associating with any one participating device (e.g., single authentication group association such as a group key). According to certain aspects, the device may select which participating device to associate based on a received indication of mobility information regarding the participating devices. For example, as discussed in more detail below, the device may choose to associate with a stationary device that can act as a proxy for the device to range with other devices in the NDL. According to certain aspects, FTM information may be transmitted in probe request messages and probe response messages.

Example Ranging Via Proxy

As noted above, according to certain aspects, ranging may be accomplished via proxy devices. In one example implementation, stationary devices may act as ranging proxies. Ranging by proxy may help devices, in effect, range with devices that may be outside their immediate vicinity (such that direct ranging may not be available).

A proxy device may provide range/location information of neighboring devices that have ranged with the proxy device. The proxy device may broadcast (e.g., via discovery messages or via beacons if the proxy devices is a master) neighborhood information which may be listened by other devices. Alternatively, the proxy device may receive a query from another device and may transmit (e.g., in unicast message) neighborhood information to the device in response to the query.

According to certain aspects, the proxy device may also provide information about services supported by the neighborhood devices. According to certain aspects, a bloom filter or similar techniques may be implemented to efficiently pack information about several neighborhood devices in one message. A bloom filter, generally provides an indication that a device or service may be available, but without certainty. In other words, while a value of a bloom filter may be used to determine with certainty that a device or service is not available, the bloom filter indicates only possible availability which justifies the overhead of further discovery.

Figure 9:
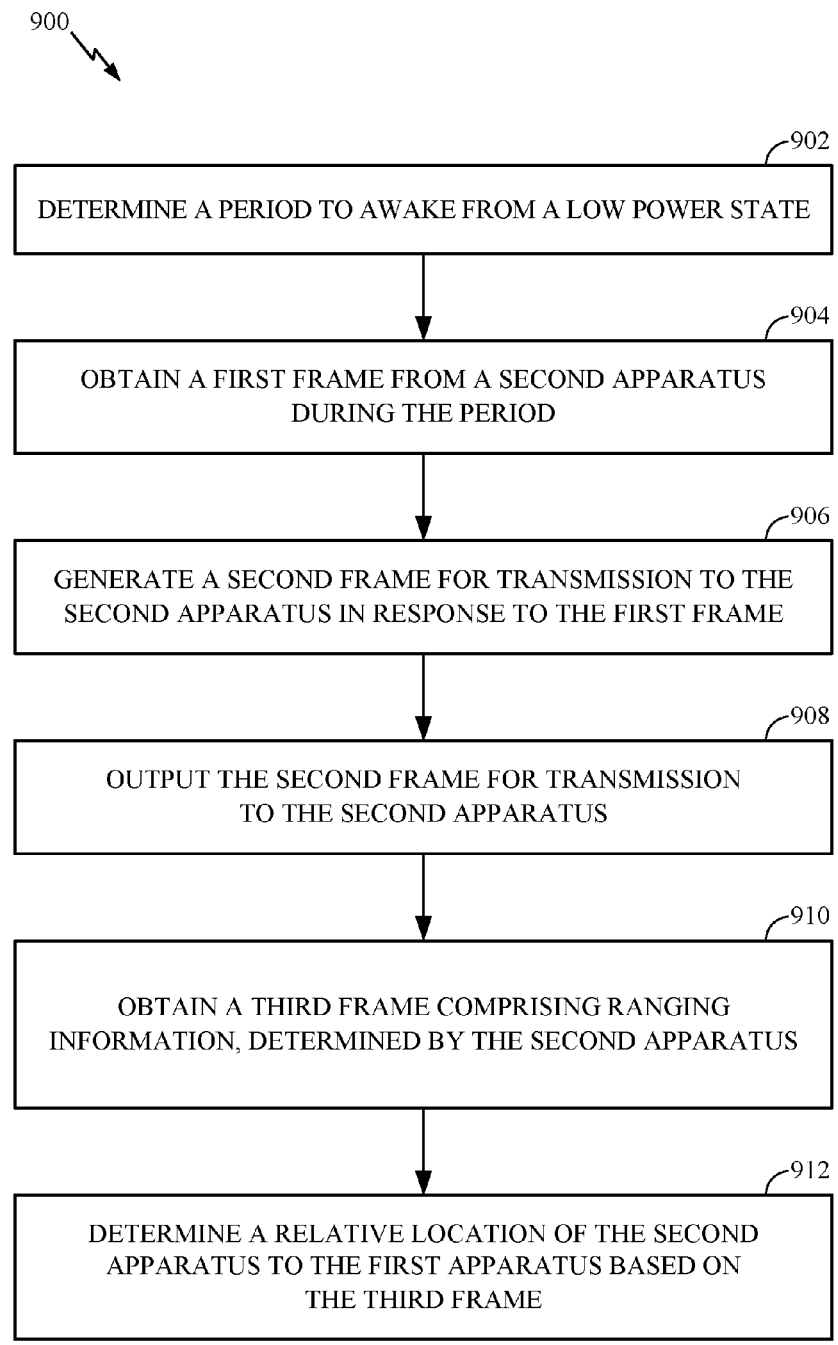
FIG. 9 illustrates a block diagram of example operations for wireless communications by a responding apparatus, in accordance with certain aspects of the present disclosure.
Figure 9A:
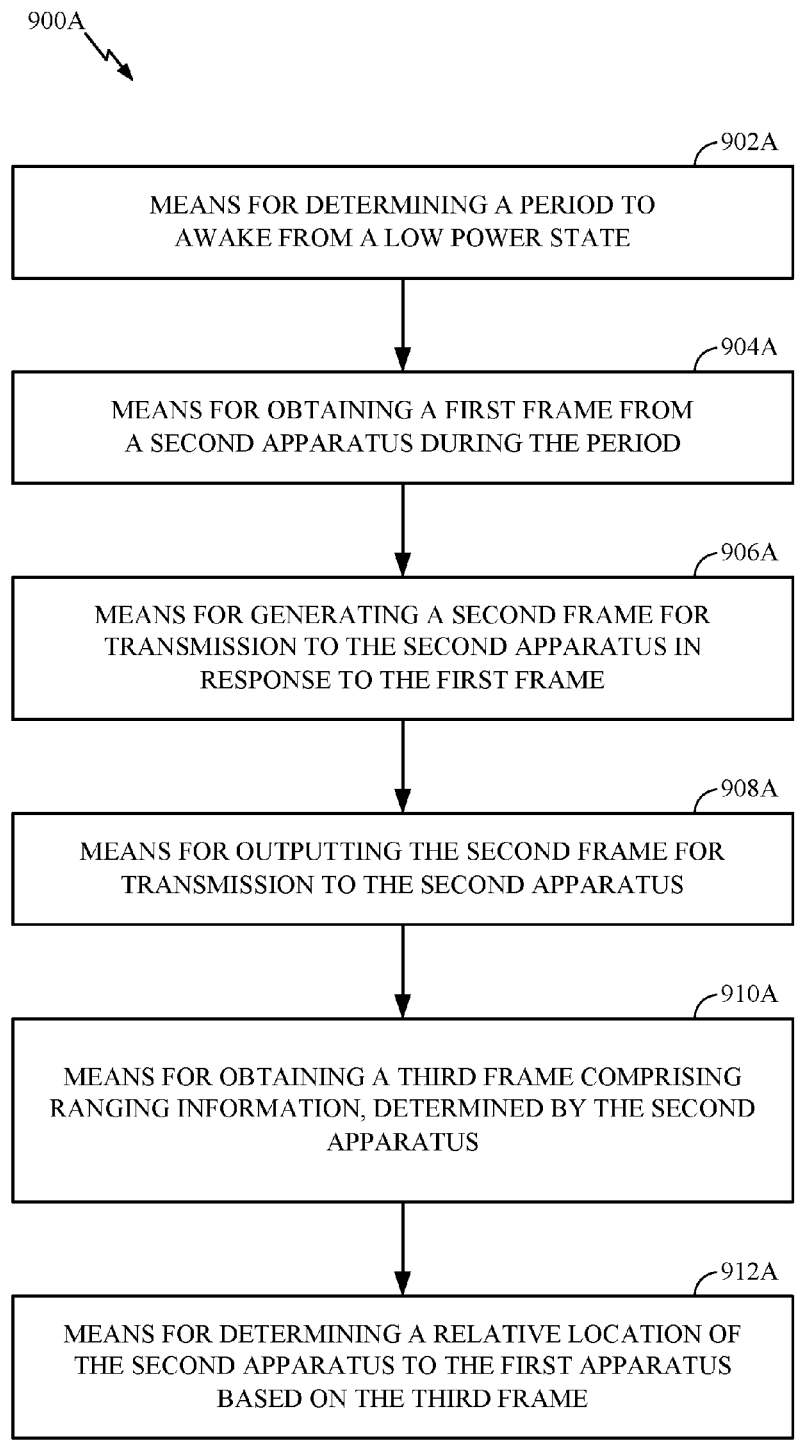
FIG. 9A illustrates example means capable of performing the operations shown in FIG. 9.

FIG. 9 illustrates a block diagram of example operations 900 for ranging by proxy, in accordance with certain aspects of the present disclosure. The operations 900 may be performed, for example, by an responding STA (e.g., user terminal 120). The operations 900 may begin, at 902, by determining a period to awake from a low power state.

At 904, the responding STA may obtain a first frame from a second apparatus (e.g., the initiating STA) during the period. At 906, the responding STA may generate a second frame for transmission to the second apparatus in response to the first frame. At 908, the responding STA may output the second frame for transmission to the second apparatus. At 910, the responding STA may obtain a third frame comprising ranging (e.g., FTM) information, determined by the second apparatus, based on a time difference between transmission of the first frame and receipt of the second frame. And at 912, the responding STA may determine a relative location of the second apparatus to the first apparatus based on a third frame.

According to certain aspects, by applying the efficient ranging techniques described above, ranging may be performed with reduced signaling overhead and power consumption. For example, by exchanging FTM information in already scheduled wake-up periods, power consumption may be reduced because additional wake-up time for ranging do not need to be scheduled. Additionally, by including FTM information in existing frames, signaling overhead may be reduced.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission. In some cases, a single interface (e.g., a transceiver) may be able to transmit (or output for transmission) and receive (or obtain).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 900 illustrated in FIGS. 7 and 9 correspond to means 700A and 900A illustrated in FIGS. 7A and 9A, respectively.

For example, means for receiving and means for obtaining may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for generating and means for determining may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above. For example, an algorithm for determining a period that at least one second apparatus is scheduled to be awake, an algorithm for generating a first frame for transmission to the second apparatus during the period, an algorithm for outputting the first frame for transmission, an algorithm for obtaining a second frame in response to the first frame, an algorithm for determining ranging information based on a time difference between transmission of the first frame and receipt of the second frame, an algorithm for generate a third frame including the ranging information, and an algorithm for outputting the third frame for transmission. In another example, an algorithm for determining a period to awake from a low power state, an algorithm for obtaining a first frame from a second apparatus during the period, an algorithm for generating a second frame for transmission to the second apparatus in response to the first frame, an algorithm for outputting the second frame for transmission to the second apparatus, an algorithm for obtaining a third frame comprising ranging information, determined by the second apparatus, based on a time difference between transmission of the first frame and receipt of the second frame, and an algorithm for determining a relative location of the second apparatus to the first apparatus based on a third frame.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a period that at least one second apparatus is scheduled to be awake, instructions for generating a first frame for transmission to the second apparatus during the period, instructions for outputting the first frame for transmission, instructions for obtaining a second frame in response to the first frame, instructions for determining ranging information based on a time difference between transmission of the first frame and receipt of the second frame, instructions for generate a third frame including the ranging information, and instructions for outputting the third frame for transmission. In another example, instructions for determining a period to awake from a low power state, instructions for obtaining a first frame from a second apparatus during the period, instructions for generating a second frame for transmission to the second apparatus in response to the first frame, instructions for outputting the second frame for transmission to the second apparatus, instructions for obtaining a third frame comprising ranging information, determined by the second apparatus, based on a time difference between transmission of the first frame and receipt of the second frame, and instructions for determining a relative location of the second apparatus to the first apparatus based on a third frame.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a processing system configured to:
determine a period that at least one wireless device is scheduled to be awake; and
generate a first frame for transmission to the at least one wireless device during the period;
a first interface configured to output the first frame for transmission; and
a second interface configured to obtain a second frame after the first frame is output for transmission, wherein:
the processing system is further configured to:
determine ranging information based on a time difference between outputting the first frame and obtaining the second frame; and
generate a third frame including the ranging information; and
the first interface is further configured to output the third frame for transmission.

2. The apparatus of claim 1, wherein:
the ranging information comprises fine timing measurement (FTM) information.

3. The apparatus of claim 1, wherein:
the apparatus is configured as a non-access point (AP) station and the at least one wireless device comprises a non-AP station.

4. The apparatus of claim 1, wherein:
the at least one wireless device is a member of a neighbor aware network (NAN); and
the processing system is configured to determine the period that the at least one wireless device is scheduled to be awake based on a synchronization signal of the NAN.

5. The apparatus of claim 1, wherein:
at least one of the first frame, the second frame, or the third frame is communicated during an association procedure performed with the at least one wireless device.

6. The apparatus of claim 5, wherein:
the at least one of the first frame, the second frame, or the third frame comprises an association or authentication frame.

7. The apparatus of claim 5, wherein:
the second interface is configured to obtain, from the at least one wireless device, an indication of mobility information; and
the processing system is configured to initiate the association procedure with the at least one wireless device based on the indication.

8. The apparatus of claim 1, wherein:
at least one of the first frame, the second frame, or the third frame comprises a probe request, a probe response, a receive trigger frame or a transmit poll frame.

9. The apparatus of claim 1, wherein:
determining the period that the at least one wireless device is scheduled to be awake comprises determining that the at least one wireless device is scheduled to send or receive data based on a traffic announcement.

10. The apparatus of claim 1, wherein:
the first interface is configured to output the third frame for transmission to at least another wireless device.

11. The apparatus of claim 10, wherein:
the processing system is configured to generate a fourth frame including mobility information indicating whether the apparatus is stationary; and
the first interface is configured to output the fourth frame for transmission to at least one of: the at least one wireless device or the at least one other wireless device.

12. The apparatus of claim 10, wherein:
the third frame comprises a broadcast discovery message, a broadcast synchronization beacon, or a neighbor aware network (NAN) service discovery message that includes service information about at least the wireless device.

13. The apparatus of claim 10, wherein:
the second interface is further configured to obtain a fourth frame from the at least one other wireless device requesting the ranging information; and
the third frame is output for transmission to the at least one other wireless device in response to the fourth frame.

14. The apparatus of claim 1, further comprising:
a transmitter configured to transmit the first frame and the third frame; and
a receiver configured to receive the second frame, wherein the apparatus is configured as a wireless station.

15. An apparatus for wireless communications, comprising:
a processing system configured to determine a period to awake from a first power state;
a first interface configured to obtain a first frame from a wireless device during the period, wherein the processing system is further configured to generate a second frame for transmission to the wireless device after the first frame is obtained from the wireless device during the period; and
a second interface configured to output the second frame for transmission to the wireless device, wherein:
the first interface is further configured to obtain a third frame comprising ranging information; and
the processing system is further configured to determine a relative location of the wireless device to the apparatus based on the ranging information included in the third frame.

16. The apparatus of claim 15, wherein:
the ranging information comprises fine timing measurement (FTM) information.

17. The apparatus of claim 15, wherein:
at least one of the first frame, the second frame, or the third frame is communicated during an association procedure performed with the wireless device.

18. The apparatus of claim 17, wherein:
at least one of the first frame, the second frame, or the third frame comprises an association frame, an authentication frame, a probe request or a probe response.

19. The apparatus of claim 18, wherein:
the first interface is configured to obtain, from the wireless device, an indication of mobility information; and
the processing system is configured to initiate the association procedure based on the indication.

20. The apparatus of claim 15, wherein:
the processing system is configured to determine the period to awake from the first power state based on a synchronization signal.

21. The apparatus of claim 15, wherein:
determining the period to awake from the first power state comprises determining that the apparatus is scheduled to send or receive data based on a traffic announcement.

22. The apparatus of claim 15, wherein:
at least one of the first frame, the second frame, or the third frame comprises at least one of a receive trigger frame or a transmit poll frame.

23. The apparatus of claim 15, wherein:
the first interface is configured to obtain a fourth frame including ranging information regarding at least another wireless device; and
the processing system is configured to determine a relative distance between the wireless device and the other wireless device based on the ranging information included in the fourth frame.

24. The apparatus of claim 23, wherein:
the processing system is configured to determine a relative distance between the wireless device and the other wireless device based on the ranging information included in the fourth frame only if mobility information indicates the wireless device is stationary.

25. The apparatus of claim 23, wherein:
the fourth frame comprises a broadcast discovery message, a broadcast synchronization beacon, or a neighbor aware network (NAN) service discovery message that includes service information about at least the other wireless device.

26. The apparatus of claim 23, wherein:
the processing system is configured to generate a fifth frame requesting the ranging information regarding the other wireless device; and
the second interface is configured to output the fifth frame for transmission.

27. The apparatus of claim 23, wherein:
the fourth frame includes ranging information regarding one or more additional wireless devices.

28. The apparatus of claim 15, further comprising:
a receiver configured to receive the first frame and the third frame; and
a transmitter configured to transmit the second frame, wherein the apparatus is configured as a wireless station.

29. A method for wireless communications by an apparatus, comprising:
determining a period that at least one wireless device is scheduled to be awake;
generating a first frame for transmission to the wireless device during the period;
outputting the first frame for transmission and obtaining a second frame after outputting the first frame;
determining ranging information based on a time difference between outputting the first frame and obtaining the second frame
generating a third frame including the ranging information; and
outputting the third frame for transmission.

30. A method for wireless communications by an apparatus, comprising:
determining a period to awake from a first power state;
obtaining a first frame from a wireless device during the period;
generating a second frame for transmission to the wireless device after obtaining the first frame from the wireless device during the period;
outputting the second frame for transmission to the wireless device;
obtaining a third frame comprising ranging information; and
determining a relative location of the wireless device to the apparatus based on the ranging information included in the third frame.

* * * * *